Patented Nov. 21, 1950

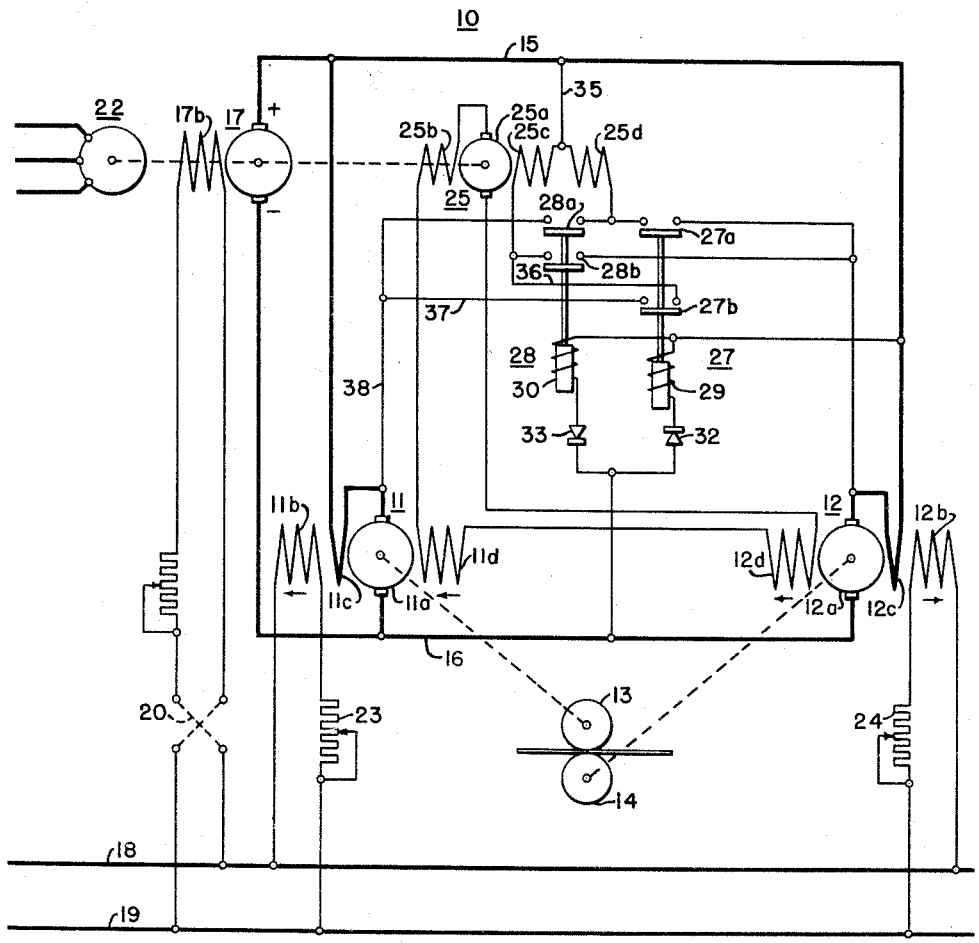

2,530,930

UNITED STATES PATENT OFFICE 2,530,930

LOAD BALANCING MOTOR CONTROL SYSTEM

Eugene F. Allbert, Buffalo, N. Y., assignor to Westinghouse Electric Corporation, East Pittsburgh, Pa., a corporation of Pennsylvania Application March 16, 1949, Serial No. 81,708

3 Claims. (Cl. 318—45)

My invention relates generally to load balancing systems, and it has reference in particular to load balancing control systems for use with reversing motor drives, such as the twin motor drives used for reversing rolling mills and the like.

Generally stated, it is an object of my invention to provide a load balancing motor control system that is simple and inexpensive to manufacture, and reliable and effective in operation.

More specifically, it is an object of my invention to provide, in a load balancing motor control system for a reversing twin motor drive, for normally operating a load balancing regulating generator with one control field winding energized from each motor, and for transferring each of the control field windings of the load balancing regulating generator from one motor to the other when reversing the motors.

Another object of my invention is to provide, in a load balancing control system for a twin motor drive, for reversing the energization of the load balancing field windings of the motors when the mill is reversed by reversing the voltage applied to the motor armatures, without interrupting the circuits of the field windings.

Yet another object of my invention is to provide, in a load balancing motor control system, for utilizing a reversal of motor bus polarity for controlling the polarity of a load balancing regulating generator.

It is also an object of my invention to provide, in a load balancing motor control system, for utilizing a pair of polarized relays for reversing the connections of the load balancing regulating generator field windings to the motors when the motors are reversed.

It is an important object of my invention to provide, in a load balancing control system for a reversing twin motor drive, for utilizing a reversal in polarity of a bus supplying electrical energy to the motors for reversing the connections of the load balancing field windings of the regulating generator to the motors when the motors are reversed by such reversal of the supply bus polarity.

Other objects will in part be obvious, and will in part be explained hereinafter.

In practicing my invention in one of its forms, each motor of a twin motor drive for a reversing rolling mill is provided with a separately excited shunt field winding and a load balancing field winding. The armatures of the motors are energized from a reversible voltage bus or source, and the load balancing field windings are energized in opposite senses from a load balancing regulating generator having opposed control or load balancing field windings. The control field windings are individually connected across the commutating and compensating field windings of the motors for one direction of motor rotation, and the connection reversed for the opposite direction of rotation. Polarized relays energized from the reversible voltage bus reverse the connections of the control field winding of the regulating generator to the motors when the motors are reversed, so as to maintain the necessary load balancing relation of the control field windings.

For a more complete understanding of the nature and scope of my invention, reference may be made to the following detailed description, which may be read in connection with the accompanying drawing, in which the single figure is a diagrammatic view of a load balancing motor control system embodying the invention in one of its forms.

Referring to the drawing, the reference numeral 10 may denote generally a load balancing control system for a twin motor reversing drive comprising, motors 11 and 12, which may be connected in driving relation with the upper and lower rolls 13 and 14, respectively, of a reversing rolling mill.

The motors 11 and 12 may be of any suitable type having armatures 11a and 12a, shunt field windings 11b and 12b, series commutating and compensating field windings 11c and 12c, and load balancing field windings 11d and 12d, respectively. The armatures 11a and 12a may be supplied with electrical energy from bus conductors 15 and 16, which may be connected to a main generator 17 having a separately excited shunt field winding 17b energized from a suitable source of substantially constant voltage represented by the exciter bus conductors 18 and 19. A reversing switch 20 may be utilized for reversing the polarity of the generator field excitation, so as to reverse the voltage applied to the armatures of the motors 11 and 12. A motor 22 may be utilized for driving the main generator 17.

The shunt field windings 11b and 12b may be energized from the exciter bus conductors 18 and 19 through suitable field rheostats 23 and 24, respectively. The load balancing field windings 11d and 12d may be connected in series circuit relation and in opposite senses, for energization from a load balancing regulating generators 25.

The load balancing regulating generator 25 may comprise an armature 25a and a series field winding 25b which may be connected in series circuit relation with the field windings 11d and 12d. The regulating generator may also be provided with control field, windings 25c and 25d, which may be connected for energization in accordance with the loads on th motors 11 and 12, so as to provide cumulative excitation for the motor having the greater load and differential excitation for the motor having the lesser load.

In order to provide for controlling the excitation of the load balancing field windings 11d and 12d when the motors 11 and 12 are reversed by reversing the polarity of the supply bus, control means, such as the "forward" and "reverse" control relays 27 and 28 may be provided having operating windings 29 and 30, respectively. The control relays may be connected for energization between the bus conductors 15 and 16, and may be provided with oppositely disposed rectifier devices 32 and 33 so as to make the relays selectively responsive to the polarity of the voltage applied to the motors 11 and 12. The control relays 27 and 28 function to reverse the connections of the control field windings 25c and 25d to the motors when the motors are reversed, so as to maintain the proper relationship between the load balancing field windings 11d and 12d and the shunt field windings 11b and 12b.

When the motors 11 and 12 are operating in the "forward" direction, the bus conductor 16 will be positive and the "forward" control relay 27 will be energized. Accordingly, the cntrol field winding 25c of the load balancing regulating generator 25 will be connected across the series compensating and commutating field winding 11c of motor 11 through a circuit extending from bus conductor 15 through conductor 35, control field winding 25c, conductor 36, contact members 27b, conductor 37, and conductor 38. The control field winding 25d will likewise be connected across the series compensating and commutating field winding 12c of motor 12 through contact member 27a.

Since the control field windings 25c and 25d are opposed, the load balancing regulating generator 25 will have substantially zero output voltage when the loads on the motors 11 and 12 are balanced. Should the motor 11, for example, assume more than its proportionate share of the total load, the excitation of the control field winding 25c will be increased and the regulating generator 25 will produce an output voltage in a direction to make the field winding 11d of motor 11 comulative with respect to the shunt field winding 11b, while the field winding 12d of motor 12 will be differential with respect to the shunt field winding 12b.

Accordingly, the motor 11 tends to slow down and drop a portion of its load while a motor 12 tends to speed up and pick up more of the load, thus balancing the total load between the motors in the desired ratio. Should the motor 12 assume more than its shart of the total load, the action of the regulating generator 25 will be to make the winding 12d of motor 12 cumulative with respect to the shunt field winding 12b, while the winding 11d of motor 11 becomes differential with respect to the shunt field winding 11b.

When the mill is reversed, the switch 29 will be operated to reverse the energization of the generator field winding 17b, thus reversing the polarity of the voltage applied to the armatures 11a and 12a of the motors. Accordingly, the "forward" control relay 27 will return to the de- energized position, while the "reverse" control relay 28 operates to the energized position. The control field winding 25c will now be connected across the series compensating and commutating field winding 12c of motor 12 through contact member 28b, while the control field winding 25b will be connected across the series compensating and commutating field winding 11c of motor 11 through contact member 28a.

Should the motor 11 assume more than its share of the total load, the excitation of the control field winding 25d will be increased. This results in energization of the field winding 11d of motor 11 in the same sense as previously described in connection with the "forward" operation of the motors, since the direction of current flow through the series field windings 11c and 12c is now reversed, and this reversal is offset by interchanging the connections of the control field windings 25c and 25d of the regulating generator 25. Accordingly, the load balancing control system will be effective for either direction of rotation of the motors 11 and 12.

From the above description and the accompanying drawing, it will be apparent that I have provided in a simple and effective manner for obtaining balance of load between reversing motors which may be connected to a common load. By interchanging or reversing the connections of the control field windings on the load balancing regulating generator to the motors, a simple and efficient control system is provided requiring a minimum of circuit changes. Instead of requiring the usual four contactors for the load balancing field windings of the motors, only a pair of control relays for the control field windings of the load balancing generator are necessary.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

I claim as my invention:

1. In combination with a pair of reversing motors connected to a common load and having series-type field windings with a common connection therebetween, a load balancing generator connected to supply excitation to the motors in opposite senses and having excitation field windings connected in opposed relation one across the series field winding of each motor so as to be individually responsive to the load on a different one of the motors, and control means individually connecting the excitation field windings across the series field windings of the motors, said control means being operable with reversal of the motors to reverse the connections of one end of each of the excitation field windings to the motors so as to disconnect each of them from the series field winding of the motor to which it is connected and connect it to the series field winding of the other motor.

2. In combination, a pair of reversing motors connected in driving relation with a common load said motors having series-type field windings connected at one end to a common bus, a load balancing regulating generator connected to supply equal and opposite excitation to each of said motors, said regulating generator having a pair of excitation windings, circuit means connecting one terminal of each of the windings to said common bus, reversing means connecting the other end of each of the excitation windings to the other end of a different one of the series-type field windings to be energized in accordance with the load on a different one of said motors and in opposite senses, said reversing means being operable when the motors are reversed to interchange the connection of said other ends of the excitation windings.

3. In a load balancing system for a pair of reversing motors having armatures connected in driving relation with a common load and having load balancing field windings, circuit means connecting the motor armatures to a reversible source of electrical energy, a load balancing generator having an armature connected in series circuit relation with the load balancing field windings to energize them in opposite senses and a pair of regulating field windings, a pair of control relays, one of said relays being operable to connect each of the regulating field windings for energization in opposite senses in accordance with the armature current of a different one of said motors and the other being operable to interchange the connections of said regulating field windings with the motors, and additional circuit means including oppositely disposed rectifier devices connecting the control relays to the reversible source in opposite senses to obtain cumulative excitation of the load balancing field winding of the motor having the greater load.

EUGENE F. ALLBERT.

REFERENCES CITED

The following references are of record in the file of this patent:

UNITED STATES PATENTS

| Number | Name | Date |
|---|---|---|
| 1,877,681 | Mickey | Sept. 13, 1932 |